United States Patent [19]
Miller et al.

[11] Patent Number: 6,105,095
[45] Date of Patent: Aug. 15, 2000

[54] DATA PACKET ROUTING SCHEDULER AND METHOD FOR ROUTING DATA PACKETS ON A COMMON BUS

[75] Inventors: Karl Eric Miller, Chandler; Gary James Lang, Gilbert, both of Ariz.

[73] Assignee: Motorola, Inc., Schaumburg, Ill.

[21] Appl. No.: 09/027,819

[22] Filed: Feb. 23, 1998

[51] Int. Cl.[7] .................................................. G06F 13/00
[52] U.S. Cl. ..................... 710/107; 710/116; 710/244; 370/462
[58] Field of Search .................... 710/107–125, 710/131–132, 240–244; 370/412–418, 451–456, 461–462

[56] References Cited

U.S. PATENT DOCUMENTS

| | | | |
|---|---|---|---|
| 4,979,100 | 12/1990 | Makris et al. | 710/117 |
| 5,265,257 | 11/1993 | Simcoe et al. | 710/263 |
| 5,440,698 | 8/1995 | Sindhu et al. | 709/225 |
| 5,644,733 | 7/1997 | Kalish et al. | 710/113 |
| 5,892,766 | 4/1999 | Wicki et al. | 370/412 |
| 5,949,789 | 9/1999 | Davis et al. | 370/452 |

Primary Examiner—Ayaz R. Sheikh
Assistant Examiner—Sumati Lefkowitz
Attorney, Agent, or Firm—Gregory J. Gorrie

[57] ABSTRACT

A data processing system (20) schedules the allocation of a common bus (26), used by multiple service requesters (32). The system (20) creates a plurality of service request levels (44) and assigns each service requester (32) to one of the plurality of request levels (44). Services of the common bus (26) are provided to all service requesters (32) assigned to a first service request level (44) for each instance of providing service to one of the service requesters (32) assigned to a second service request level (44). The method then again provides services of the common bus (26) to all service requesters (32) assigned to the first service request level (44) for a single instance of providing service to one of the second level requesters (32).

18 Claims, 3 Drawing Sheets

DATA PACKET ROUTING SCHEDULER AND METHOD FOR ROUTING DATA PACKETS ON A COMMON BUS

FIELD OF THE INVENTION

The present invention relates generally to a data processing system. More specifically, the present invention relates to scheduling a common service, such as data packet routing that is needed by multiple service requesters.

BACKGROUND OF THE INVENTION

Many data processing systems, including communication systems, receive, process and transmit relatively large quantities of data in a relatively short period of time. Such systems use data handling functions or schemes to manage or control a massive amount of data flow often divided into data packets. Further, such data processing systems often provide various common services to multiple data sources or service requesters.

Hardware and software limitations prevent systems from processing and transmitting data as fast as it is received. As a result, data processing systems and communication systems use data handling schemes to place restrictions on or regulate the flow of input data to accommodate the system's processing and transmission rates and to achieve an optimal data flow rate within the system.

Conventional data handling schemes incorporate a compromise that attempts to allocate an amount of system time and resources for servicing each service requester based on the requester's individual needs. During each service requester's allotted time, that requester is provided full use of system resources, such as data transfer, bus communication, data transmission and the like. Outside of the requester's allocated time, the requester may be provided with a minimal portion of the system's resources, such as buffered memory for storing input data from the service requester.

In conventional data processing systems and communication systems, data handling schemes are configured to provide system services for requesters that send data packets at a rate or frequency that is controlled by the requester. This situation can present these systems with a wide range of input data rates that desirably need to be accommodated. In an attempt to optimize data flow within these systems, conventional data handling schemes use various methods.

One simple method is herein referred to as a round robin method. The round robin method assigns a service number to each requester and then goes sequentially from a minimum service number to a maximum service number, checking to see if the requester at that service number is requesting service. This method gives each requester an equal opportunity to obtain system services. Unfortunately, the round robin method does not balance service among the requesters. Accordingly, requesters requiring more frequent servicing, such as those requesters with relatively high input data rates, have no more opportunity to obtain service than requesters requiring less frequent servicing. Furthermore, the round robin method typically cannot guarantee service to these high rate requesters.

Another method, hard priority, assigns a priority to each requester in accordance with the requester's input data rate. Requesters having high input data rates are assigned high priority and requesters having low input data rates are assigned low priority. The requester with the highest priority will receive service whenever it requests service. Lower priority requesters receive service only when higher priority requesters are not requesting service. If one or more requesters have a relatively high priority and one requester has a relatively low priority, the requester with the low priority may have to wait an undesirable length of time before being serviced and may possibly not get serviced at all. This method tends to over-service higher priority requesters and causes lower priority requesters to be starved for service. In addition, the hard priority method requires more buffer memory than the round robin method since data from low priority requesters must be stored while high priority requesters are serviced, and the lowest priority requester typically cannot be guaranteed of receiving service.

A soft priority method, uses a relatively large memory buffers to temporarily hold data packets from the requesters being serviced. Data packets in the buffer are routed out of the buffers according to a first-in-first-out (FIFO) priority scheme. This method uses packet depth in the buffer to initiate a variable priority scheme. That is, the buffer is examined and data packet routing is prioritized according to which requesters have the most amount of data packets in the buffer. For example, a requester having 100 data packets in the buffer will have its data packets routed out of the buffer before a requester having 2 data packets in the buffer. The soft priority method uses relatively large buffers which are expensive, increase system power requirements and reduce system reliability. Moreover, the soft priority method increases transport delay between data packet arrival and data packet servicing, which is undesirable for real time applications such as communication systems.

The above discussed and other data handling methods fail to provide for a balance in service when service requesters have divergent input data rates. This typically results in a build up of data packets causing undesirable and/or unacceptable delays in data transmission. For a communication system transmitting voice data between two phone users, a delay of several data packets may cause such a large delay in a conversation that the communication is unacceptable.

Accordingly a need exists for an improved method to schedule allocation of system services in common use by multiple service requesters within a data processing system.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

Figure 1:
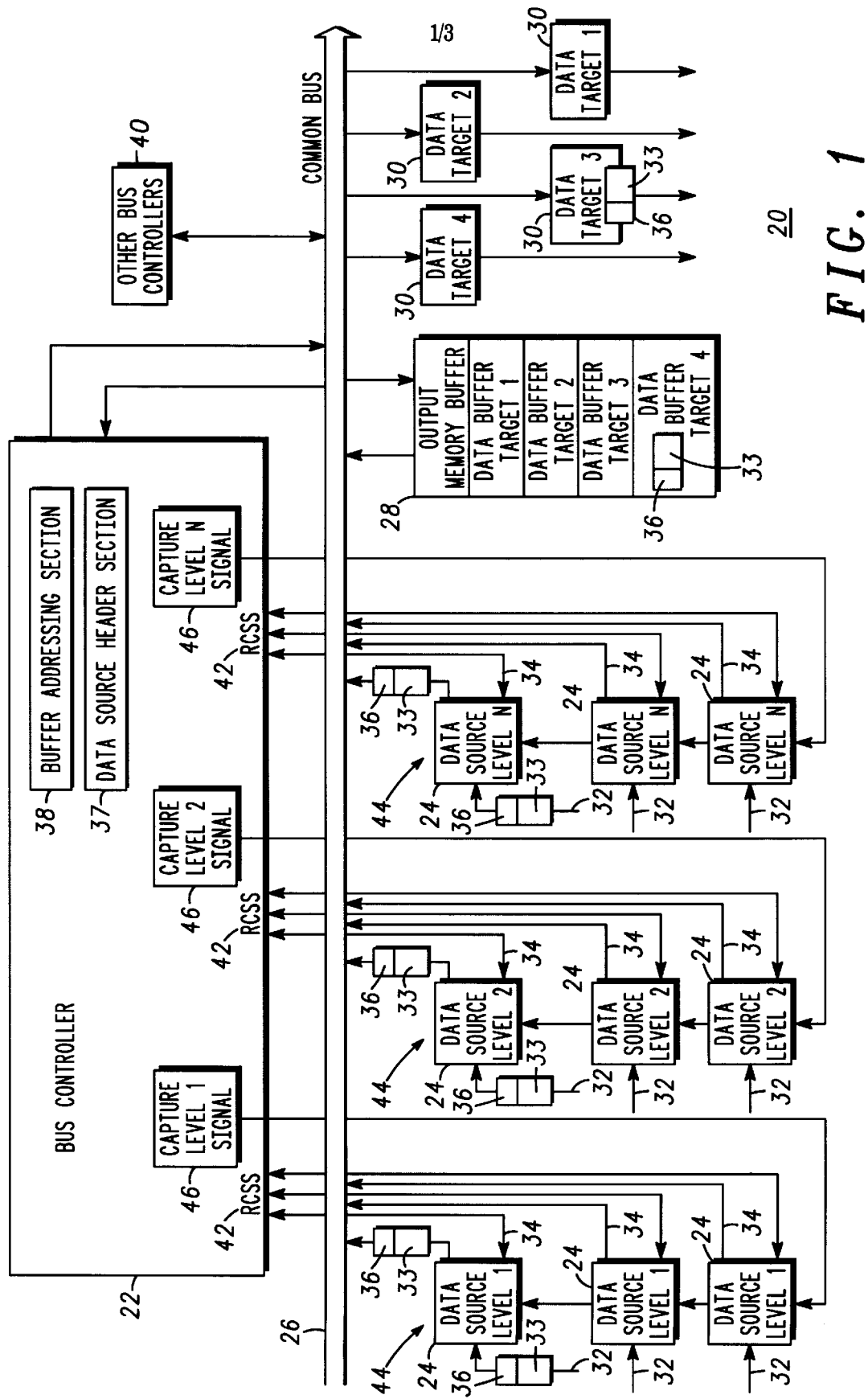
FIG. 1 shows a block diagram of a system having a bus controller that controls data flow from multiple data source levels across a common bus in accordance with a preferred embodiment of the present invention.

FIG. 1 shows a block diagram of a data processing system 20 that has a bus controller 22 that controls data flow from a data source 24 (nine shown), across a common or shared bus 26 to an output memory buffer 28 and a data target 30 (four shown). For one preferred embodiment, data processing system 20 is a communication system that has a data packet routing scheduler for controlling data flow within the system. Each data source 24 receives data that is destined for some data target 30. Bus controller 22 regulates data flow such that data flows from data source 24 to common bus 26, from there to output memory buffer 28, and then to data target 30. Each data source 24 is shown as being partitioned or assigned to a designated level, levels 1 through N are shown and discussed in detail below. N is a variable integer that represent a last level of system 20 and may be a different value for each different system 20.

Each data source 24 receives input from a service requester 32 (nine shown). Each service requester 32 is a different service requester that sends data to its data source 24. Data from each service requester 32 is configured to be a stream of data packets 33. However, FIG. 1 schematically depicts only a few of data packets 33 at various positions in system 20 for clarity. Each data packet 33 has a corresponding data source header 36. Data source header 36 contains identification information for data packets 33, such as a destination for packet 33 and the like. Data packets 33 may be of a predetermined size and arrive at data source 24 at a predetermined rate but these are not requirements. Each data source 24 is coupled to common bus 26 such that data source outputs 34 from each data source 24 are available to common bus 26. Data source outputs 34 provide data from corresponding service requesters 32 and may provide a service request confirmation signal corresponding to that data source 24. Bus controller 22 couples to common bus 26.

A data source header section 37 of bus controller 22 translates packet headers 36 to determine destination for packets 33. A buffer addressing section 38 of bus controller 22 generates output memory buffer addresses in response to packet header destination information. Buffer addressing section 38 identifies an appropriate buffer address in output memory buffer 28 for use by each data source 24 in levels one through N for its corresponding data packets 33.

Output memory buffer 28 is coupled to common bus 26 such that memory buffer 28 can receive data packets 33 from common bus 26 and can transmit data packets 33 on common bus 26. Common bus 26 is additionally coupled to data targets 30 such that common bus 26 can transfer data packets 33 from output memory buffer 28 to the appropriate data target 30 (four shown). Common bus 26 also couples to other bus controllers 40 such that common bus 26 can transfer data as controlled by other bus controllers 40 in system 20.

FIG. 1 shows bus controller 22 as communicating control signals over a unique requester control signal set (RCSS) 42 with each data source 24. RCSS 42 is used by bus controller 22 to identify service requesters 32 that are requesting access to common bus 26. For discussion purposes, each RCSS 42 port in bus controller 22 is shown followed by a decimal number. The number to the left of the decimal indicates a service request level 44 of that RCSS 42, and the number to the right of the decimal indicates a number identifying the service requester 32 of that RCSS 42. For example, RCSS 1.1 indicates that this RCSS 42 is the first service requester 32 in service request level one and RCSS 1.2 indicates that this RCSS 42 is the second service requester 32 in service request level one. RCSS 1.P indicates that service request level one can have up to P of service requesters 32, where P is an integer number. RCSS 2.Q indicates that service request level two or the second service request level can have up to Q service requesters 32, where Q is an integer number. In a like manner, RCSS N.R indicates that bus controller 22 can accommodate N service request levels 44 and R service requesters 32 in the $N^{th}$ service request level, where R is an integer number.

Bus controller 22 also outputs a capture level signal 46 for each corresponding service request level 44. Capture signal 46 is routed to each data source 24 in that level. When capture signal 46 is activated for any given request level 44, requests for service in that level at that instant are captured or latched.

Figure 2:
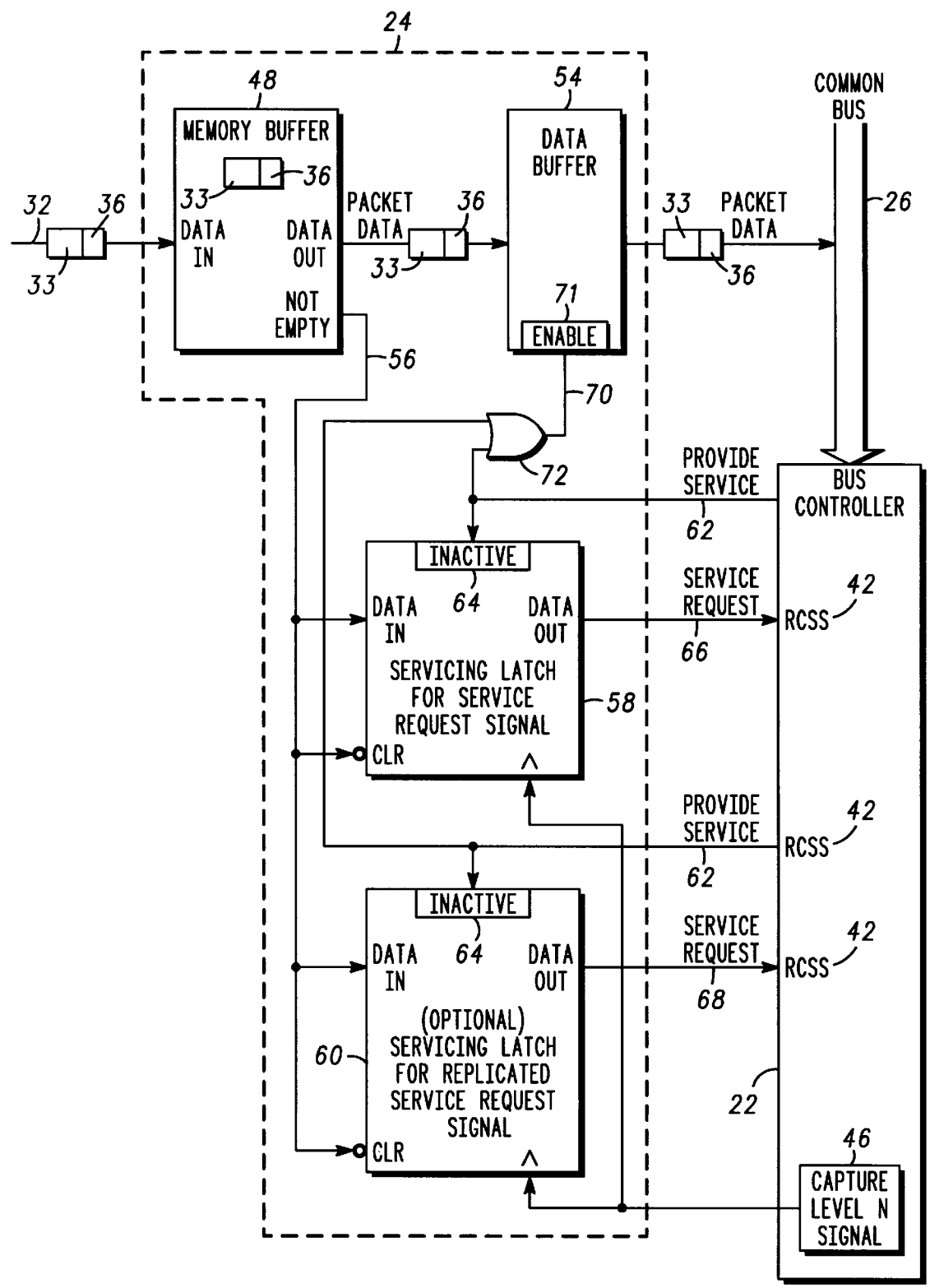
FIG. 2 shows a block diagram detailing an exemplary data source that is referenced in FIG.1.

FIG. 2 shows a block diagram of data source 24 in accordance with one embodiment of the present invention. Each data source 24 in FIG. 1 (nine shown) is desirably configured in a like manner to that shown in FIG. 2. However, as will be discussed in more detail below, different data sources 24 provide data at different rates. A memory buffer 48 initially receives data packets 33 from service requester 32. Memory buffer 48 is coupled to a data buffer 54 which is coupled to common bus 26 and common bus 26 is coupled to bus controller 22 as discussed above in connection with FIG. 1. Memory buffer 48 is shown outputting a "not empty" signal 56 to data buffer 54. FIG. 2 also shows RCSS 42 ports (two shown) of bus controller 22 coupling to servicing latches 58 and 60, where servicing latch 60 is an optional replicate servicing latch. A "provide service" signal 62 is included in each RCSS 42. Provide service signal 62 is output from bus controller 22, drives either a set or clear input (labeled "inactive") of a corresponding servicing latch 58 or 60, and drives an input of a gate 72 that is configured to provide an OR logic function. An output of gate 72 couples to an enable input 71 of data buffer 54. Data inputs of servicing latches 58 and 60 are also configured to receive not empty signal 56 from memory buffer 48.

Memory buffer 48 routes data packets 33 out of memory buffer 48, through data buffer 54, and onto common bus 26 when enabled to do so by gate 72. Memory buffer 48 also optionally outputs not empty signal 56 through data buffer 54 onto common bus 26 when enabled to do so. Not empty signal 56 is activated when memory buffer 48 stores at least one data packet 33. Servicing latches 58 and 60 are configured to receive capture level signal 46 (level N shown) at clock inputs thereof. When capture level signal 46 is activated, the state of not empty signal 56 is captured in servicing latch 58 and replicated servicing latch 60 and sent to bus controller 22 as a service request signal 66 and a replicated service request signal 68, respectively. Service request signals 66 and 68 are included in respective RCSS' 42.

An active service request 66 or 68 causes bus controller 22 to eventually activate the corresponding provide service signal 62 to gate 72 and servicing latch 58. The process by which bus controller 22 decides to activate the corresponding provide service signal 62 is discussed below in connection with FIG. 3. In servicing latch 58 and/or 60, an active service signal 62 causes servicing latch 58 or 60 to toggle from an active condition to an inactive condition. Provide service signal 62 also causes gate 72 to assert enable signal 70 to data buffer 54, allowing a data packet 33 in memory buffer 48 to be routed onto common bus 26. In this embodiment, replicated service request signal 68 is a duplicate of service request signal 66 from servicing latch 58.

FIG. 2 also shows that data packets 33 are routed from data buffer 54 onto common bus 26 when enable signal 70 is activated. Data buffer 54 also routes not empty signal 56 to common bus 26 when enabled to do so. Bus controller 22 uses not empty signal 56 from common bus 26 to confirm service request signal 66 from servicing latch 58 or 60. When data packets 33 from memory buffer 48 are enabled onto common bus 26 with an active not empty signal 56, bus controller 22 confirms that the data is valid. Conversely, when a data packet 33 is associated with an inactive not empty signal (i.e. memory buffer is empty) bus controller 22 regards the data packet 33 as invalid. Such a situation may arise when data packets 33 in memory buffer 48 have already been sent (i.e. service has already been provided).

FIG. 2 shows bus controller 22 sending provide service signals 62 to servicing latch 58 and to optional replicate servicing latch 60. It should be noted that data source 24 may be configured without replicate servicing switch 60, in which case provide service signal 62 would only be sent to servicing latch 58 and gate 72 can be removed. Those skilled in the art will realize that providing service for service request signal 66 or replicated service request signal 68 can be accomplished by other means. For example, replicate servicing latch 60 could be driven by an input having a logic signal that identifies when two or more data packets 33 are in memory buffer 48. Thus, only latch 58 captures a request when only one packet 33 is in buffer 48 and both of latches 58 and 60 capture requests when two or more packets 33 are in buffer 48.

Figure 3:
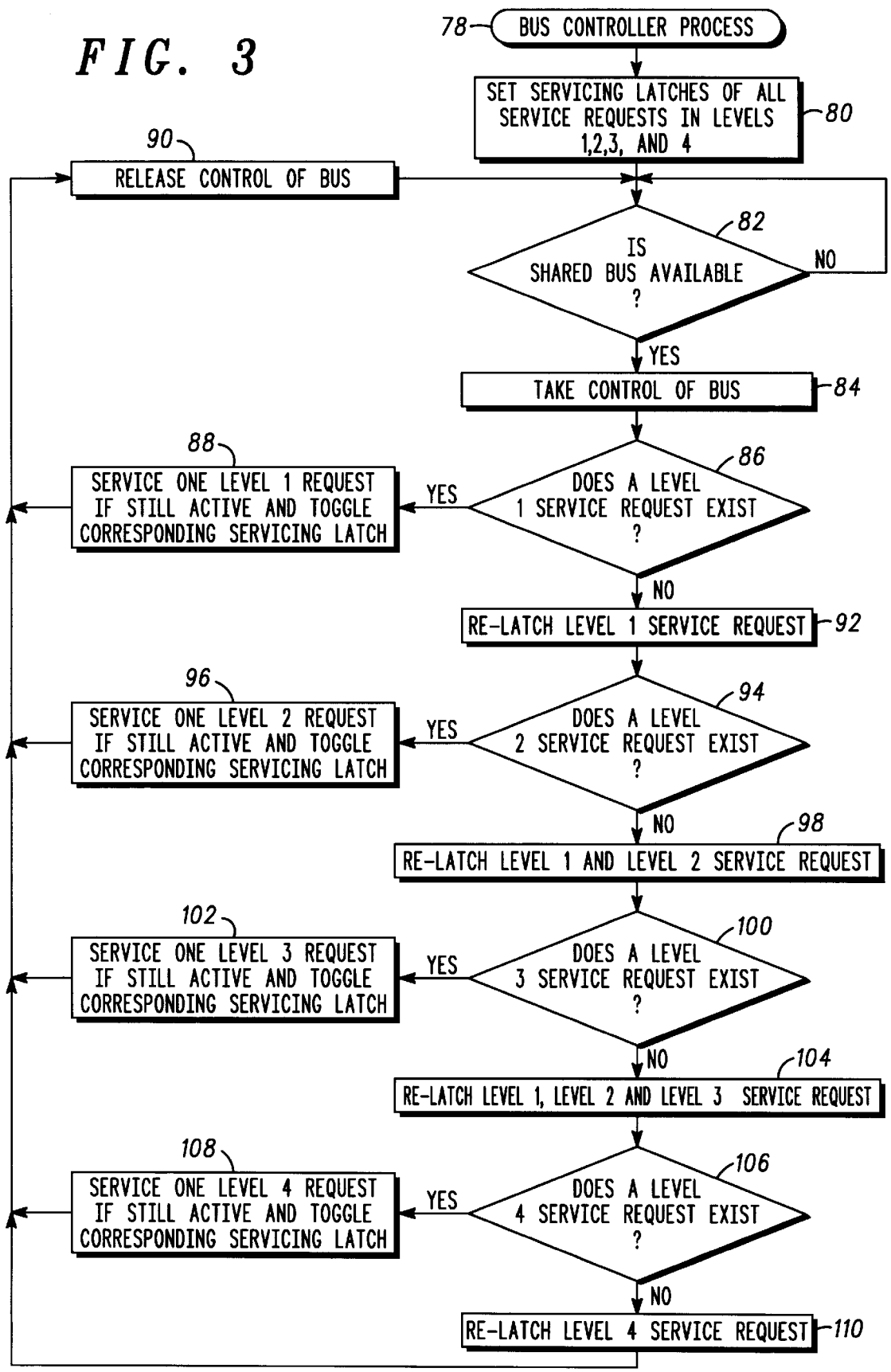
FIG. 3 shows an exemplary flowchart of a bus controller that uses four service request levels to schedule allocation of services to multiple service requesters in accordance with a preferred embodiment of the present invention.

FIG. 3 shows a flowchart of an exemplary process 78 used by bus controller 22 for four service request levels 44 (FIG. 1) to schedule allocation of services from common bus 26 to multiple service requesters 32 in accordance with a preferred embodiment of the present invention. While FIG. 3 depicts an implementation of precisely four service request levels 44, a desirable number of service request levels 44 for data processing system 20 may be determined using the following equation:

$$N = \text{LOG}_2\left(\frac{1}{2} \frac{S_{MAX}}{S_{MIN}}\right). \quad \text{EQ. 1}$$

Where:
N=the number of service request levels 44 for a system 20,
$S_{max}$=a maximum service period, and
$S_{min}$=a minimum service period.

The referenced service period is inversely proportional to a rate at which service requester 32 transmits data packets 33 to system 20. $S_{max}$ is the service period of the lowest packet rate requester, and $S_{min}$ is the service period of the highest packet rate requester in the system. In one embodiment of the present invention $S_{max}$ is at least 10 times greater than $S_{min}$. Accordingly a desirable number of levels is based on the ratio of the maximum service period to the minimum service period and for one embodiment, service requesters 32 are assigned to a level based on their service periods. A greater diversity in service periods is handled by using a greater number of levels. Configuring service request levels 44 in this manner assures that each service requester 32 and each data source 24 in each serve request level 44 will be serviced or given access to common bus 26 (see FIG.1).

Bus controller 22 need not know whether a given RCSS 42 controls a servicing request latch 58 or a replicate servicing request latch 60 (FIG. 2). Accordingly bus controller 22 treats servicing request 66 and replicated servicing request 68 in a like manner. The discussion presented below is presented from the perspective of a single service request, (e.g. service request 66) but applies equally as well to the replicated service request 68.

Bus controller process 78 begins the control process by latching all servicing latches 58 and 60 for each service requester 32 and each data source 24 in levels 1,2,3, and 4 (FIG. 1) at a first instant, in a task 80. This latching of servicing latches 58 and 60 occurs in response to bus controller 22 asserting all capture level signals 46 (FIG. 1). Control then goes to a monitoring task 82 where bus controller 22 determines if shared or common bus 26 is available for use. Bus 26 may be unavailable when other controllers 40 (FIG. 1) have control of bus 26. When common bus 26 is not available, bus controller 22 continues to check for availability of common bus 26 and continues to process monitoring task 82.

When common bus 26 becomes available, bus controller 22 takes control of common bus 26 in a task 84. Next, a monitoring task 86 checks first service request level 44 for a service requester 32 having a service request 66 (FIG. 2) in an active condition. As discussed above, the first service request level 44 includes those data sources 24 that captured requests in response to assertion of the level one capture signal 46. If an active service request exists, program control proceeds to a task 88.

In task 88 any one of the currently pending service requests is selected for the receipt of services. Task 88 causes bus controller 22 to assert the "provide service" signal 62 for the selected service requester 32. The assertion of this provide service signal 62 causes the corresponding servicing latch 58 or 60 (FIG. 2) to be toggled, cleared or otherwise set to an inactive condition. In addition, not empty signal 56 is enabled onto common bus 26 (FIG. 2) and checked by controller 22 in one embodiment to confirm that the service request signal is still active and that at least one data packet 33 is still in the corresponding memory buffer 48 (FIG.2). As discussed earlier, data packets 33 may have already been sent and memory buffer 48 could be empty. When the appropriate not empty signal 56 is present the respective request is serviced. A discussion of steps that constitute request servicing for one embodiment of the present invention is presented below.

When data packet 33 is enabled onto bus 26, controller 22 evaluates packet header section 37 (FIGS. 1–2). In response to the evaluation, an appropriate address is formed in output memory buffer 28 (FIG. 1). This buffer address is associated or otherwise corresponds to a particular data target 30. The entire data packet 33 is moved to the specified address in output memory buffer 28. At some later time, perhaps determined by other controllers 40, data packet 33 is extracted from output memory buffer 28 and sent to data target 30 specified in packet header 36. In an alternative embodiment, the packet 33 may be moved directly to a specified data target 30. Accordingly, request servicing provides a switching function in which data packets 33 arriving at data sources 24 are switched to data targets 30.

After task 88 control goes to a task 90 where bus controller 22 releases control of common bus 26 so that other bus controllers 40 can access common bus 26. After releasing control of common bus 26 control returns to monitoring task 82. When common bus 26 again becomes available, control again goes to monitoring task 86 to check for any level one service requests still active from those captured in task 80. Program control remains in a programming loop that includes tasks 86, 88, 90, 82 and 84 until all the first level request captured in task 80 have been serviced. When all the active service requests in service request level one have been serviced, and no active service request remains in service requests level one, control goes from monitoring task 86 to a task 92.

In task 92, all service requests 66 in service request level one are latched again or re-latched at a second instant. After task 92, control goes to a monitoring task 94 that checks for an active service request in the second service request level or service request level two. If an active service request exists in this second level, a task 96 services any one of the currently pending service requests for level two in a like manner as described above for task 88.

After task 96 control goes to task 90 where bus controller 22 releases control of common bus 26 so that other bus controllers 40 can access common bus 26. After releasing control of common bus 26 control returns again to monitoring task 82. When common bus 26 becomes available, control passes to monitoring task 86 to check for level one active service requests that were captured at the second instant in task 92. Processing remains in the loop that includes tasks 88, 90, 82, 84 and 86 until all service requests in request level one captured in task 92 are serviced, at which time process 78 recaptures the level one requests again in task 92 and services a single level two request in task 96. This recapturing of level one requests, causes level one requests to be serviced more frequently than level two requests. Thus, any service requester 32 in the first level is provided more access to common bus 26 than any requester 32 in levels two through N (FIG.1). Eventually, task 94 discovers that no more level two requests remain. Control then passes to a task 98.

In task 98, all service requests 66 in service request level one and request level two are unlatched and then are re-latched at a third instant. After task 98 control goes to monitoring task 100 that checks for an active service request in the third service request level or service request level three. Any such active service request was captured above at task 80. If an active service request exists, a task 102 services any one of the currently pending service requests for level three in a like manner as described in task 88. After task 102, control goes to task 90 and processing continues as shown, performing nested loops for the first, second and third levels. Eventually, task 100 decides that no more level three request remain. Control then goes to a task 104.

In a task 104, all service requests 66 in service request level one, request level two, and request level three are re-latched at a fourth instant. After task 104 control goes to a monitoring task 106 that checks for an active service request in the fourth service request level or service request level four. If an active service request exists, a task 108 services any one of the currently pending service requests for level four in a like manner as described in task 88. After task 108, control goes to task 90 and processing continues as shown, performing nested loops for the first, second, third, and fourth levels. Eventually, task 106 decides that no more level four requests remain. Control then goes to a task 110.

In task 110, all service requests 66 in service request level four are re-latched at a fifth instant. It should be noted that for processing to get to task 110, task 104 would have already been processed, which makes task 100 functionally equivalent to task 80. After task 110 control passes back to task 90 and processing continues as discussed above.

An actual amount or fraction of time of access to common bus 26 allocated to each service request level 44 and to each service requester 32 can be determined using equations as defined and described below.

An approximate sum of all service request level's fractional allocation of common bus services is represented by the geometric series in the form of:

$$\sum_{m=1}^{n} \frac{1}{k^m} \quad \text{EQ. 2}$$

where:

m=identifies a particular service request level, n=the number of service request levels, and k=an integer repeat factor that indicates how many times servicing of a level is repeated before proceeding to the next level. For figures and examples herein, k=2 for the convince of implementation. Further, this geometric series allows multiple service requesters to exist on any given level so that service requesters with like service periods and similar servicing needs, can be grouped together.

An approximate fraction of common bus service allocated to each service request level is represented by the equation:

$$(k-1)\left(\frac{1}{k^N}\right) \quad \text{EQ. 3}$$

where:

N=any level, and k=2 and for the simplest case of one service requester per service request level.

An approximate fraction of common bus service allocated to a service request level having multiple service requesters is represented by the equation:

$$\left(\frac{M(k-1)}{M(k-1)+1}\right)(L) \quad \text{EQ. 4}$$

where:

M=the number of service requesters in that service request level, k=2, and

L=an amount of remaining common bus resource not allocated to higher levels than the service level being evaluated.

An approximate fraction of common bus service allocated to each service requester in a service request level having multiple service requesters is represented by the equation:

$$\left(\frac{(k-1)}{M(k-1)+1}\right)(L) \quad \text{EQ. 5}$$

where:

M=the number of service requester in that service request level, k=2, and

L=an amount of remaining common bus resource not allocated to higher levels than the service level being evaluated.

An approximate fraction of common bus service allocated to a service requester that is assigned to a service request level R times in a service request level having multiple service requesters is represented by the equation:

$$(R)\left(\frac{(k-1)}{M(k-1)+1}\right)(L) \qquad \text{EQ. 6}$$

where:
R=an integer replication number, indicating how many times a request signal is repeated,
M=the number of service requester in that service request level,
k=2, and
L=an amount of remaining common bus resource not allocated to higher levels than the service level being evaluated.

In summary, the present invention provides an apparatus and a method that schedules allocation of common bus 26 for multiple service requesters 32 in system 20. Each service requester 32 can be assured to be serviced in less than one of its service periods. That is, for an exemplary service requester 32 that transmits data over a given time period (service period) can be assured of service in less time than its transmitting data rate.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for scheduling allocation of a common service used by a plurality of service requesters within a data processing system, said method comprising the steps of:
    a) creating a first service request level and a second service request level;
    b) assigning each of said service requesters to at least one of said first and second request levels;
    c) providing said common service to each of said service requesters in said first request level;
    d) providing said common service to less than all of said service requesters in said second request level; and
    e) repeating said providing step c) after said providing step d), wherein:
        each of said service requesters has a service period such that said service requesters collectively have a maximum service period and a minimum service period; and
        said creating step creates an integer number of said request levels based on a ratio of said maximum service period to said minimum service period.

2. A method as claimed in claim 1 wherein said maximum service period is at least ten times greater than said minimum service period, and wherein the creating step creates ten request levels.

3. A method for scheduling allocation of a common service of a bus shared by a plurality of service requesters within a data processing system, said method comprising the steps of:
    a) receiving requests for service by said service requesters, each service requester having a service period associated therewith;
    b) assigning each of said service requesters to one of at least a first and second request level based on the associated service period;
    c) providing said common service to each of said service requesters in said first request level;
    d) after the performance of step c), providing said common service to one of said service requesters in said second request level;
    e) repeating said providing step c) after said providing step d) for all requests for service received during the performance of step d) which are assigned to the first service request level;
    f) creating a plurality of said request levels, the number of said request levels of said plurality being based on a ratio of a maximum service period to a minimum service period of said service requesters, wherein said first and second request levels are service request levels of said plurality of request levels, and wherein in the assigning step, said service requesters are assigned to one of said request levels of said plurality of request levels based on their associated service period; and
        wherein said common service is provided to all existing service requesters assigned to a higher request level before said common service is provided to one service requester of a lower request level;
        and before said common service is provided to another service requester of a lower request level, providing said common service to service requesters assigned to higher levels that exist after said providing said common service to said one service requester of the lower request level.

4. A method as claimed in claim 3 wherein:
each of said service requesters generates a service request signal;
a servicing latch is provided for each service requester;
said method additionally comprises the step of setting each servicing latch to one of an active condition and an inactive condition in response to said service request signal for each service requester; and
each of said providing steps c) and d) provides said common service to service requesters whose servicing latch is in said active condition.

5. A method as claimed in claim 4 wherein:
said providing step c) additionally comprises the step of toggling said respective servicing latches to said inactive condition in response to providing said common service to each of said service requesters in said first request level; and
said providing step d) additionally comprises the step of toggling said respective servicing latches to said inactive condition in response to providing said common service to each of said service requesters in said second request level.

6. A method as claimed in claim 3 wherein said assigning step includes the step of assigning each service requester to one of at least a first, second and third request level, and wherein the method further comprises the steps of:
    g) providing said common service to each of said service requesters of said second level by repeating steps d) and e);
    h) providing said common service to only one of the service requesters of the third level before repeating step g) for service requesters assigned to the second level after the performance of step g).

7. A method as claimed in claim 6 wherein:
said assigning step b) assigns more than one service requester to said second service request level,
each of said service requesters generates a service request signal; and
said method additionally comprises the step of replicating one of said service request signals.

8. A method as claimed in claim 7 wherein:
said service requester with said replicated request signal is a first service requester;
a second service requester does not have a replicated request signal;
said assigning step assigns said first and second requesters to said first request level; and said providing step c) provides said common service to said first service requester more frequently than said providing step c) provides said common service to said second service requester.

9. A method for scheduling allocation of a common service used by a plurality of service requesters within a data processing system, said method comprising the steps of:
   a) creating a first service request level and a second service request level;
   b) assigning each of said service requesters to at least one of said first and second request levels;
   c) providing said common service to each of said service requesters in said first request level;
   d) providing said common service to less than all of said service requesters in said second request level; and
   e) repeating said providing step c) after said providing step d), wherein:
      said data processing system is a packet based communication system that uses a predetermined service capacity to route a plurality of data packets in said communication system; and
      said common service is a service of moving of packets over a common bus wherein said predetermined service capacity is allocated to each of said service request levels in proportion to a geometric series in the form of
      $$\sum_{m=1}^{n} \frac{1}{k^m}$$
      wherein k, m, and n are integers, k≧2, n≧2, and m represents said service request levels.

10. A method for scheduling allocation of a common service used by a plurality of service requesters within a data processing system, said method comprising the steps of:
    a) partitioning said requesters into a first level of A requesters and a second level of B requesters, where A and B are integer numbers;
    b) capturing requests at a first instant from said first and second levels of requesters;
    c) servicing up to A of said first level requests captured at said first instant;
    d) after step c), servicing up to C of said second level requests captured at said first instant, where C is an integer number less than B;
    e) at a second instant, capturing after said servicing step c), additional requests of the first level and, occasionally capturing requests of the second level;
    f) repeating said step c) for all of said first level requests captured at said second instant; and
    g) after step f), repeating said step d) for at least one of any of said second level requests captured at the first instant,
       wherein each of said requesters has a service period associated therewith and the partitioning step partitions said requesters into either said first or second level based on the associated service period.

11. A method as claimed in claim 10 wherein C is one.

12. A method as claimed in claim 10 wherein each of said capturing steps b) and e) comprise the step of:
    setting a servicing latch for each of said service requesters to one of an active condition and an inactive condition, wherein said active condition indicates a captured request.

13. A method as claimed in claim 12 wherein:
    said servicing step c) additionally comprises the step of toggling said servicing latches to said inactive condition in response to servicing said service requests; and
    said servicing step d) additionally comprises the step of toggling said servicing latches to said inactive condition in response to servicing said service requests.

14. A method as claimed in claim 10 wherein B is greater than one.

15. A method as claimed in claim 14 wherein one of said first and second level captured requests is replicated.

16. A method for scheduling allocation of a common service used by a plurality of service requesters within a data processing system, said method comprising the steps of:
    a) partitioning said requesters into a first level of A requesters and a second level of B requesters, where A and B are integer numbers;
    b) capturing requests at a first instant from said first and second levels of requesters;
    c) servicing up to A of said first level requests captured at said first instant;
    d) servicing up to C of said second level requests captured at said first instant, where C is an integer number less than B;
    e) capturing after said servicing step c), said first level requests existing at a second instant; and
    f) repeating said step c) for said first level requests captured at said second instant, wherein:
       said partitioning step a) additionally partitions said requesters into a third level of D requesters, where D is an integer number;
       said capturing step b) additionally captures requests at said first instant from said third level of requesters;
       said capturing step e) occasionally captures said second level requests existing at said second instant; and
       step f) occasionally repeats said step d) for said second level requests captured at said second instant.

17. A method as claimed in claim 10 wherein said servicing step d) services all of said second level requests captured at said first instant when there are no first level requests captured at the second instant.

18. A data packet routing scheduler for use in a packet based communication system that uses a predetermined service capacity to route a plurality of data packets in said communication system, said data packet routing scheduler comprising:
    a plurality of memory buffers each having a capacity to hold at least one of said data packets;
    a common bus coupled to said plurality of memory buffers; and
    a controller coupled to said common bus and to said memory buffers, wherein said controller is configured to establish a first service request level and a second service request level such that said data packets in said memory buffers are associated with said first and second service request levels, and to allocate said predetermined service capacity to each of said service request levels in proportion to a geometric series in the form of
    $$\sum_{m=1}^{n} \frac{1}{k^m}$$
    wherein k, m, and n are integers, k≧2, n≧2, and m represents said service request levels and to move all of said data packets in said first level at a first instant, one of said data packets in said second level at said first instant, and all of said data packets in said first level at a second instant over said common bus.

* * * * *